June 19, 1928.
C. W. SNYDER
ELECTRICALLY OPERATED VALVE FOR CONTROLLING
THE FLOW OF LIQUIDS OR GASES
Filed July 16, 1925
1,673,923
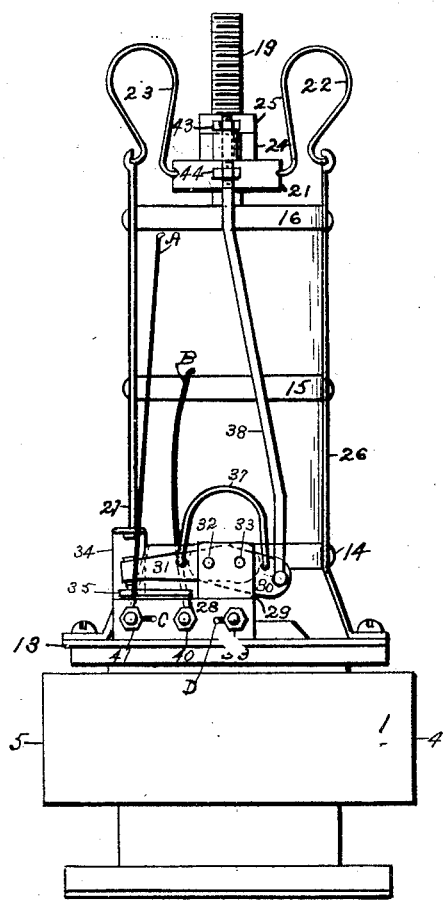
Fig. 1.
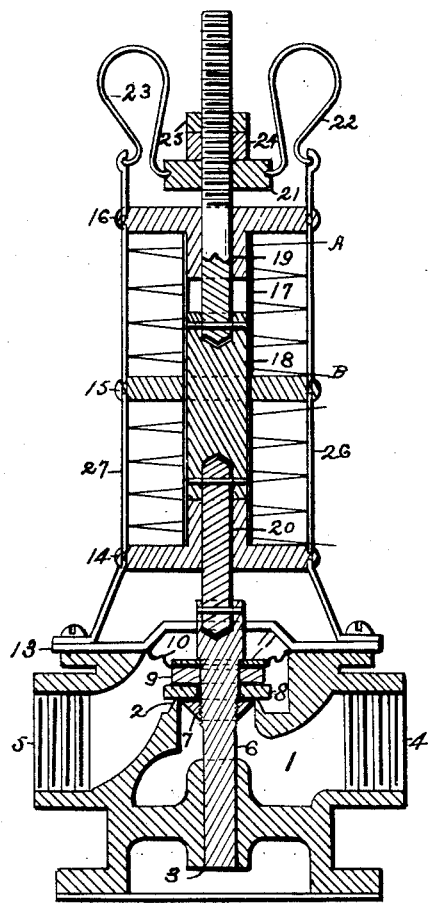
Fig. 2.
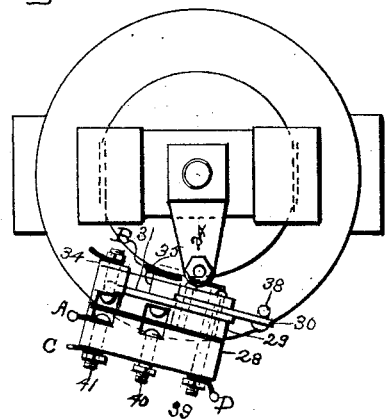
Fig. 3.
Fig. 4
Inventor
Charles Wight Snyder Patented June 19, 1928.

1,673,923

UNITED STATES PATENT OFFICE.

CHARLES WIGHT SNYDER, OF LOS ANGELES, CALIFORNIA.

ELECTRICALLY-OPERATED VALVE FOR CONTROLLING THE FLOW OF LIQUIDS OR GASES.

Application filed July 16, 1925. Serial No. 44,131.

My invention relates more particularly to valves controlling the flow of liquids or gases supplying furnaces or other similar heating devices where said device is located at a point some distance from the most desirable point of control. It consists of a valve casing, containing a valve upon which is mounted a solenoid with a single plunger, with two coils to operate the said plunger, together with a special snap switch, for controlling the current through the coils.

The following drawings illustrate my invention.

Fig. 1 is a side elevation of the valve together with the operating mechanism.

Fig. 2 is a central vertical section through Fig. 1.

Fig. 3 is a plan.

Fig. 4 is a view of the reverse side of the switch.

In the drawings, 1, is the body or valve casing containing the valve seat 2, the valve guide 3, and it is provided with the openings 4 and 5 to allow the ingress and egress of the fluid.

Contained in the body is the valve, comprising the stem 6, the nut 7, the valve facing 8, the valve 9, the diaphragm 10, the washer 11; the opening in the housing being closed by the cover plate 13. The diaphragm 10, is provided especially to prevent leakage around the valve stem, taking the place of a packing gland.

For operating the valve I provide the solenoid as shown, consisting of three steel disks 14, 15 and 16.

The electromagnets are carried by the nonmagnetic sleeve 17, inside of which is the plunger 18, in the lower end of said plunger is fixed the nonmagnetic rod 20; this in turn being attached to the stem 6 of the valve, causing the valve to move with the plunger.

In the upper end of the plunger is pinned another nonmagnetic rod 19, projecting through the top of the solenoid as shown.

As this single plunger 18, must both open and close the valve, I provide two separate windings, one at each end of the solenoid as shown, the upper winding opening the valve and the lower closing it.

I prefer to thread the upper portion of the rod 19 so that the vertical height of the block 21 may be adjusted and in each end of this block 21 I provide a groove for carrying the inner ends of the springs 22 and 23, the outer ends of the said springs having a fixed support in grooves in 26 and 27, which act as supports for the solenoid and at the same time increase the magnetism. 25 is simply a lock nut.

In the operation of a device of this kind the efficiency of the solenoid is at its maximum when the electric current can be kept flowing through the coils during practically the full stroke of the plunger. If this current is broken too early the pull is decreased, while if it is allowed to flow after the stroke of the plunger is completed, heating results. To overcome such defects, I provide the lever 24 attached to the extension of the plunger 19 and the snap switch as shown, comprising the two separate parts 28 and 29, constructed of some form of insulating material. Within a centrally located slot in the upper portion of 29, there is mounted, pivoting on the pin 32, the lever 30, also the lever 31, pivoting on the pin 33, each of these levers being provided with a slot (not shown) which allows them to move freely over the opposite pin.

The lever 31 is provided with two contact points on its free end and is also perforated for the insertion of one end of the spring 37. The lever 30 is provided with two extra holes, one for the insertion of the spring which compresses both levers toward their center and the other for insertion of the operating link 38, said link being provided with the adjusting nuts 43—44 so that the switch may be made to operate at any point in the travel of the plunger desired.

On this section of the switch 29, are also mounted the two pieces 34 and 35, 34 carrying the upper and 35 carrying the lower fixed contact points of the switch as shown. On the back of 29, is the connection 36, which makes the connection between the screw 39, the pins 32 and 33 to the lever 31.

The second section of the switch 28, carries only the two screws 40 and 41, to which wires are attached and the screw 39, which locks the switch blocks together, and at the same time carries the current to 36. There is no electrical connection between 28 and 29 excepting the screw 39.

The valve may be a metal valve of the poppet type but for use in gas I prefer to face it with leather as shown. The valve is shown in the closed position with the switch ready to open it as soon as the circuit is closed.

The wiring is shown for one winding of the solenoid only, the other is exactly the same excepting that the two wires from the winding are brought to the other two points on the switch.

In the electric circuit, the wire D is brought from the source of current and attached to the screw 39, from whence the current passes to the plate 36 to the pins 32, 33, to the lever 31, to the contact 35, to which is attached the wire B, thence to the coil of the upper portion of the solenoid and out on the wire A to the screw 41, the return wire C being attached to this same screw, carries the current back to the source. The wire D is brought directly from the source of electrical current, usually a low voltage transformer. The wire C is carried to any desired point for locating the primary control switch, said switch usually being operated by some form of thermostat though manual operation is frequently preferred.

In operation, as soon as the external circuit or primary switch is closed, either by an automatic switch as in a thermostat, or manually, the solenoid switch as shown passes the current through the upper coil of the solenoid and the plunger 18 is pulled within this coil until it strikes the disk 16.

This movement of the plunger gives an equal movement of the valve, lifting it from its seat, and at the same time the block 21 is forced upward the same distance. The outward ends of the springs 22, 23, are maintained in a fixed position in relation to the solenoid by the brackets 26, 27, therefore as the plunger 18 is raised it raises the block 21, moving the inner ends of these springs above the center line of their outward ends and as these springs are always in compression this upward deflection causes them to maintain the plunger at the upper end of its stroke and the valve in the open position.

This same upward motion of the plunger carries with it (through the rod 19) the switch operating lever 24, through which is inserted the link 38, operating the lever 30 of the switch, and as soon as this lever is advanced until its center line and the center line of the lever 31, is above the center line of the pins 32, 33, the lever 31 snaps away from the lower contact 35 and connects with the upper contact 34, breaking the current in the upper coil of the solenoid, and leaving the switch in position for passing the current through the lower solenoid, even though the primary switch remains closed.

However no current can pass through either coil until another primary connection is made for the lower coil.

Having described my invention, I claim:

1. An electrically operated valve for controlling the flow of a liquid comprising a valve casing provided with a valve seat, a valve guide and a passage for the fluid, a valve within the casing consisting of a valve and a valve stem with means for attaching the valve to the stem, an extension of the stem above the valve for connecting the valve with its means for operating, a solenoid mounted upon said valve casing the said solenoid being provided with a single core and two separate and complete windings, these windings being so situated that a current passing through one coil will pull the plunger in one direction while a current through the other coil will pull it in the reverse direction, an extension from each end of the plunger, the lower one connecting with the valve and the upper carrying a block in which is carried the ends of two flat springs, the outer ends of these springs being carried in a groove in a part of the brackets supporting the solenoid said springs being always under compression and serving to retain the plunger in either extreme position, the snap switch for controlling the electric current passing through each coil of the solenoid comprising two movable arms pivoted at a small distance from each other, a spring connecting these two arms and tending to draw them together, electrical connections to these arms, two contact points on one arm, two other contact points attached to the insulating body of the switch, a link connecting one movable arm with a lever attached to an extension of the plunger, means for adjusting this link in such a manner that the switch may be caused to operate at any point in the travel of the plunger, substantially as described.

2. An electrically operated valve for controlling the flow of fluids comprising a valve casing containing a valve, a valve guide, a valve seat and a passage for the passage of the fluid, a valve within the casing, a two part or double wound solenoid with a single plunger this said plunger being provided at each end with a nonmagnetic extension one connecting with the valve and the other extending above the solenoid, this latter carrying a lever for operating the switch and a block for carrying springs holding the plunger in position, a single snap switch comprising two movable levers with two levers carrying fixed connections, means for making these electrical connections, a link connecting the plunger with the switch said link operating the switch.

3. An electrically operated valve for controlling the flow of liquids and gases comprising a valve housing containing a valve of the poppet type, mounted on said valve housing a solenoid having two complete and approximately equal windings on one bobbin said solenoid being provided with a single steel plunger, said windings when individually energized pulling the plunger in opposite directions, a nonmagnetic extension from each end of the plunger, one of said extensions being attached to the valve, the other, extending above the free end of the solenoid and carrying a block supporting one of the ends of two springs under compression, the angularity of said springs to the plunger retaining said plunger at either end of its stroke, said upward extension of said plunger also carrying a lever for operating a snap switch, a snap switch comprising two movable arms, spring controlled arms and two fixed arms for controlling the flow of an electrical current in such a manner that the said current can flow through only one coil of the solenoid at a time, means for operating said switch by the motion of the plunger.

4. In a valve for controlling the flow of fluids, the combination of a valve housing containing a valve of the poppet type together with a fluid passage, a solenoid mounted on said valve housing consisting of a single bobbin on which is wound two separate and approximately equal coils of insulated wire, a single plunger in said solenoid having nonmagnetic extensions inserted in both of its ends, one of the said extensions attached to the valve, the other extending above the solenoid and carrying one end of springs for retaining the plunger at either end of its stroke, said upward extension also carrying a lever for operating the switch, a switch comprising a double base carrying two movable arms and two fixed arms, one movable arm being provided with two contact points and each fixed arm with one, means for causing one movable arm making contact with either of the fixed arms substantially as described.

In witness that I claim the foregoing I have hereunto subscribed my name this 1st day of July, 1925.

CHARLES WIGHT SNYDER.